US011704423B2

(12) United States Patent
Poothokaran et al.

(10) Patent No.: US 11,704,423 B2
(45) Date of Patent: Jul. 18, 2023

(54) NETWORK-SHARED DATA MANAGING SYSTEM AND METHOD

(71) Applicant: Avast Software s.r.o., Prague (CZ)

(72) Inventors: John Poothokaran, Redwood City, CA (US); Juyong Do, Cupertino, CA (US); Rajarshi Gupta, Los Altos, CA (US)

(73) Assignee: Avast Software s.r.o., Prague (CZ)

( * ) Notice: Subject to any disclaimer, the term of this patent is extended or adjusted under 35 U.S.C. 154(b) by 278 days.

(21) Appl. No.: 17/135,989

(22) Filed: Dec. 28, 2020

(65) Prior Publication Data

US 2022/0207170 A1 Jun. 30, 2022

(51) Int. Cl.
*G06F 21/62* (2013.01)
*G06F 21/60* (2013.01)
*H04L 67/1097* (2022.01)
*H04L 67/06* (2022.01)
*G06F 21/31* (2013.01)

(52) U.S. Cl.
CPC .......... *G06F 21/6218* (2013.01); *G06F 21/31* (2013.01); *G06F 21/604* (2013.01); *G06F 21/6227* (2013.01); *H04L 67/06* (2013.01); *H04L 67/1097* (2013.01)

(58) Field of Classification Search
CPC ................................................... G06F 21/6218
See application file for complete search history.

(56) References Cited

U.S. PATENT DOCUMENTS

| | | | | |
|---|---|---|---|---|
| 6,519,677 | B1* | 2/2003 | Fuente | G06F 3/0601 |
| | | | | 714/6.24 |
| 2008/0313150 | A1* | 12/2008 | Penner | H04L 67/02 |
| | | | | 705/14.54 |
| 2017/0364637 | A1* | 12/2017 | Kshepakaran | G16H 10/60 |
| 2022/0058233 | A1* | 2/2022 | Verma | G06F 16/9538 |

\* cited by examiner

*Primary Examiner* — Bradley W Holder
(74) *Attorney, Agent, or Firm* — Dovas Law, P.C.

(57) ABSTRACT

A data managing method. Metadata including a sharing policy is applied to a data file on a computing device. A sharing of the data file from the computing device via a network to a platform hosted by a computing system is detected. It is determined whether the platform is in compliance with the sharing policy, and it is reported whether the platform is in compliance with the sharing policy.

38 Claims, 9 Drawing Sheets

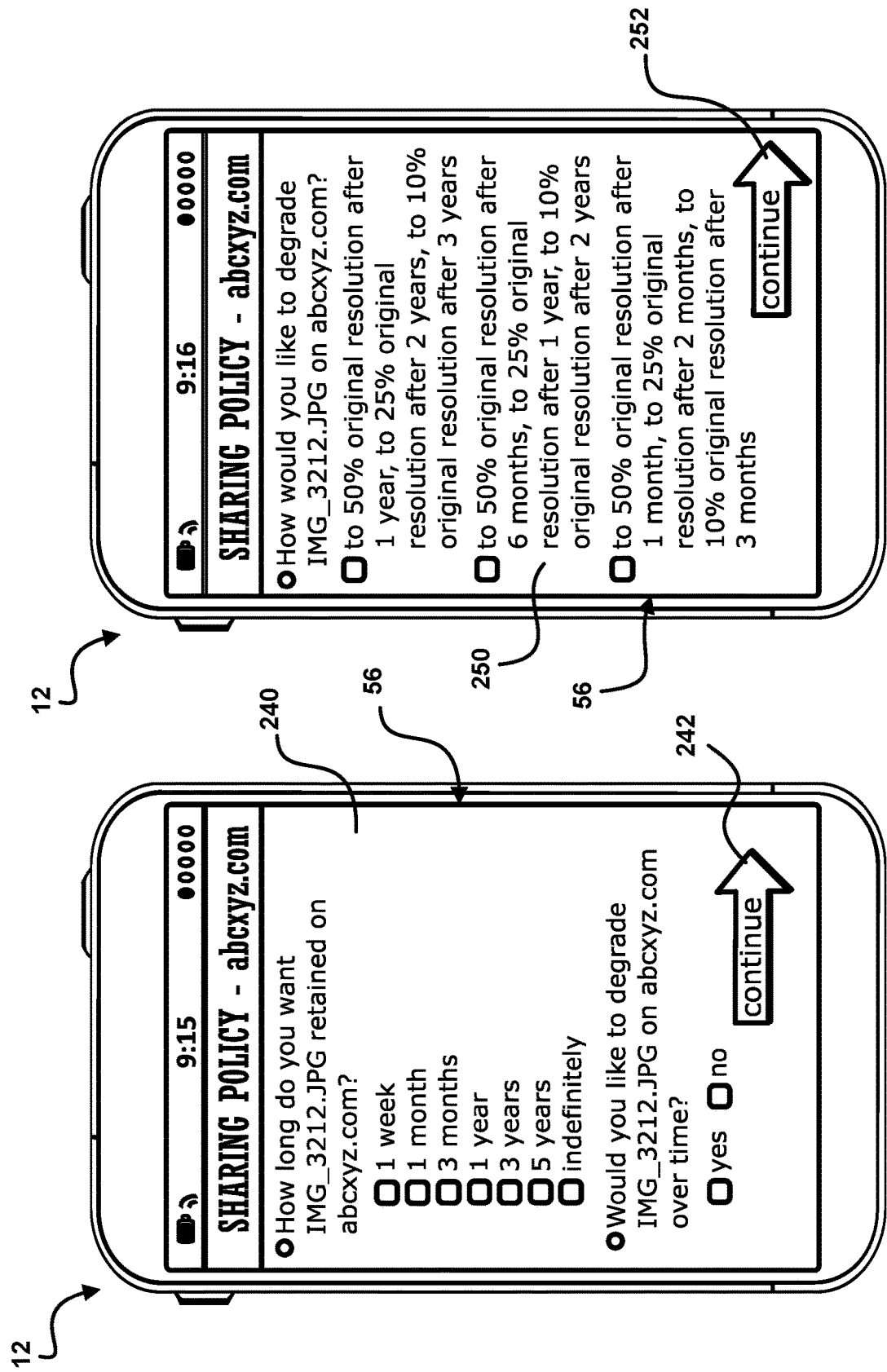

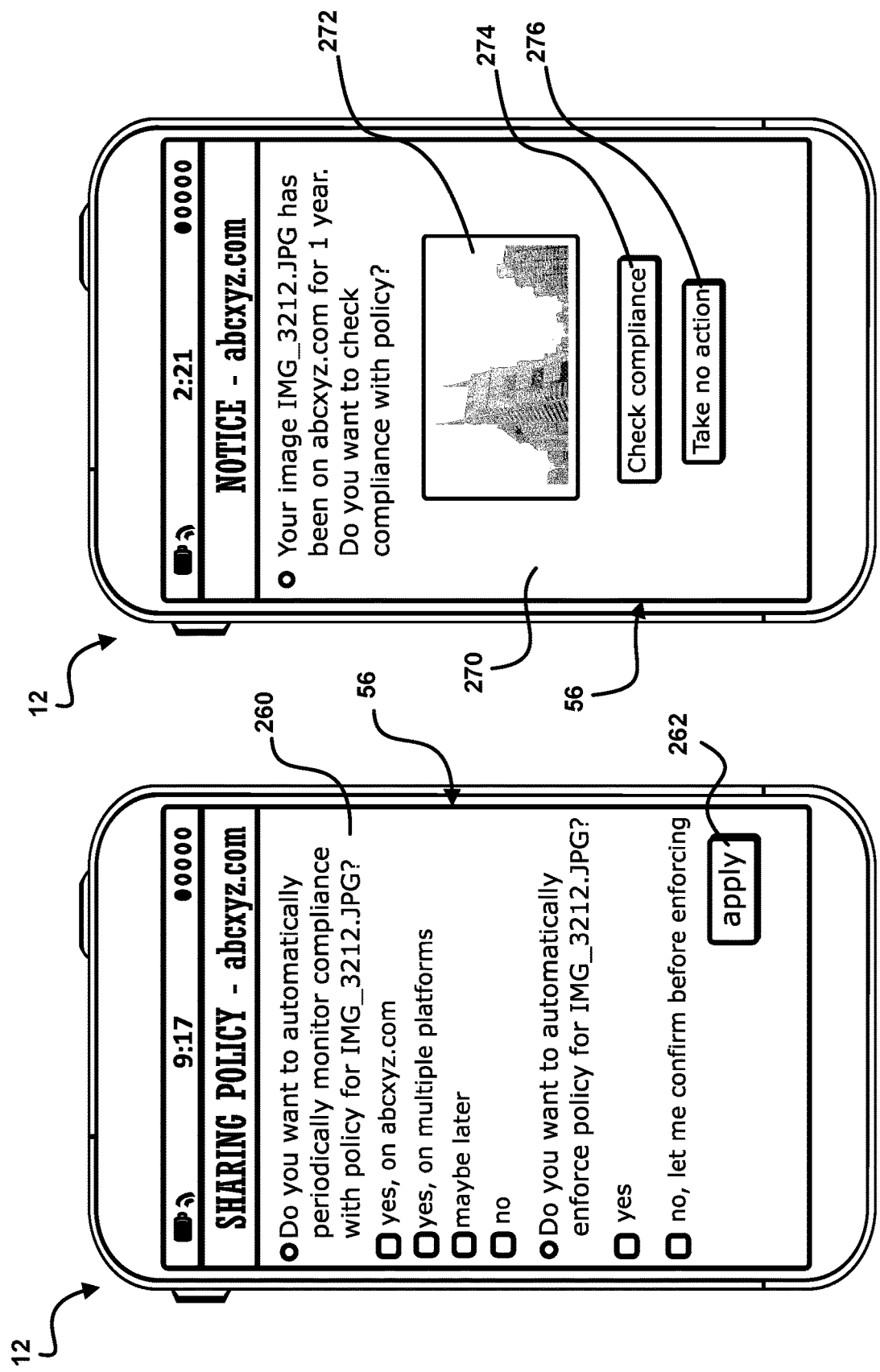

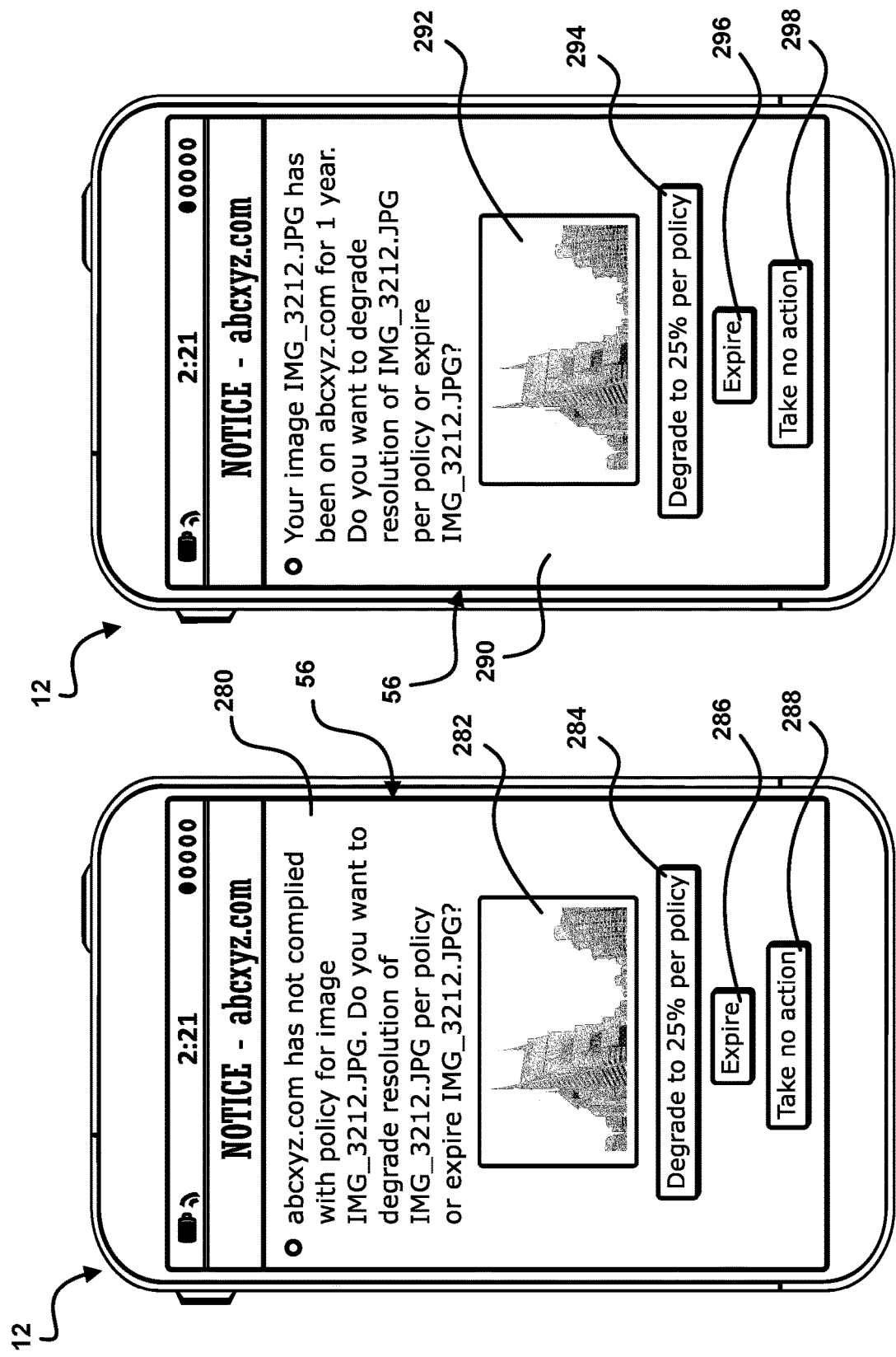

NETWORK-SHARED DATA MANAGING SYSTEM AND METHOD

FIELD OF INVENTION

The invention relates generally to data privacy, and more particularly to managing data shared through computer networks.

BACKGROUND

In the physical world, people, places, events, documents, and relationships fade away from our individual and collective memories. For the typical person, this forgetting of memories provides a measure of privacy and security. It can be unsettling for a person to be perpetually defined by their past actions and experience. Learning and growth is a part of the human experience, and mistakes publically known from a person's past may hinder that person's future success. In the online and digital world, people, places, events, documents, and relationships are not easily forgotten.

The average person is likely to share a fair amount of personal data online through computer networks including the internet. Photograph and video data files in particular are shared on social networking platforms such as Facebook™, Twitter™, and Instagram™. Once a data file is shared by a user online, the user may lose control over how the data file is shared by online platforms and other users. Shared data files may remain perpetually stored and perpetually accessible on the internet or other public or private networks. For example, photographs and videos may be forwarded unintentionally to strangers without limit. Photographs may be used without permission in training machine learning classifiers, for instance facial recognition classifiers. It is often impractical for a user to manually monitor and control sharing of their personal data after the user has shared their personal data online.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A data managing method is provided. Metadata including a sharing policy is applied to a data file on a computing device. A sharing of the data file from the computing device via a network to a platform hosted by a computing system is detected. It is determined whether the platform is in compliance with the sharing policy, and it is reported whether the platform is in compliance with the sharing policy.

A further data managing method is provided. A user interface is enabled on a computing device for receiving a policy setting for a data file. The policy setting for the data file is received via the user interface, and the policy setting is recorded as metadata of the data file. A sharing of the data file from the computing device via a network to a platform hosted by a computing system is detected. It is determined whether the platform is in compliance with the policy setting, and it is reported whether the platform is in compliance with the policy setting.

A system for managing data is provided including a computing device including a first hardware processor and a first non-transitory computer-readable storage medium coupled to the first hardware processor and storing first programming instructions for execution by the first hardware processor, wherein the first programming instructions, when executed, cause the computing device to perform operations including applying metadata including a sharing policy to a data file on the computing device and detecting a sharing of the data file from the computing device via a network to a platform hosted by a computing system. The first hardware processor and the first non-transitory computer-readable storage medium can respectively include one or more hardware processors and one or more computer-readable storage mediums. Further, a server is provided including a second hardware processor and a second non-transitory computer-readable storage medium coupled to the second hardware processor and storing second programming instructions for execution by the second hardware processor, wherein the second programming instructions, when executed, cause the server to perform operations including determining whether the platform is in compliance with the sharing policy, and reporting whether the platform is in compliance with the sharing policy. The second hardware processor and the second non-transitory computer-readable storage medium can respectively include one or more hardware processors and one or more computer-readable storage mediums. The second programming instructions, when executed, can cause the server to perform operations further including determining the platform has not complied with the sharing policy, accessing the platform via the network, and deleting or degrading the data file on the platform responsive to determining the platform has not complied with the sharing policy.

BRIEF DESCRIPTION OF THE DRAWING(S)

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein:

FIGS. 3A-3G show exemplary interactive displays on a computing device including queries generated according to described methods.

FIGS. 3H-3J show exemplary interactive displays on a computing device including notices generated according to described methods.

DETAILED DESCRIPTION OF ILLUSTRATIVE EMBODIMENT(S)

Described herein are systems and methods for allowing the forgetting of private data stored online. Controls are described enabling private data stored on public or private networks to be gradually or abruptly forgotten on a per file basis. Particularly, users are enabled to specify a fine grain sharing policy per data file to enable selective digital forgetting which can include gradual digital forgetting or abrupt digital forgetting. A user is enabled to specify a sharing policy, temporal in nature, per data file at a time of sharing, for example at a time of uploading the data file to an application or a website. Alternatively, a user is enabled to specify a temporal in nature sharing policy per data file at a time before a time of sharing the data file or a time after a time of sharing the data file.

A sharing policy as set forth herein is a policy including one or more settings in the form of one or more rules to be applied to shared data or data to be shared, including for example data degradation rules and data retention rules. A sharing policy can include instructions to degrade a shared data file after a certain number of days, hours, or other time period. Instructions can require data to be degraded linearly periodically over time, for example linearly decreasing the resolution of an image file every three (3) months since sharing. For instance the resolution of an image can be decreased by a quarter, third, or half of the original resolution every three (3) months, and the image can expire when the resolution reaches zero. Alternatively, instructions can require data to be degraded logarithmically periodically over time. Alternatively, instructions can require data to expire after a certain number of days, hours, or other time period. For example, data is required to be removed and deleted from a website or application after a certain number of days, hours, or other time period.

Figure 1:
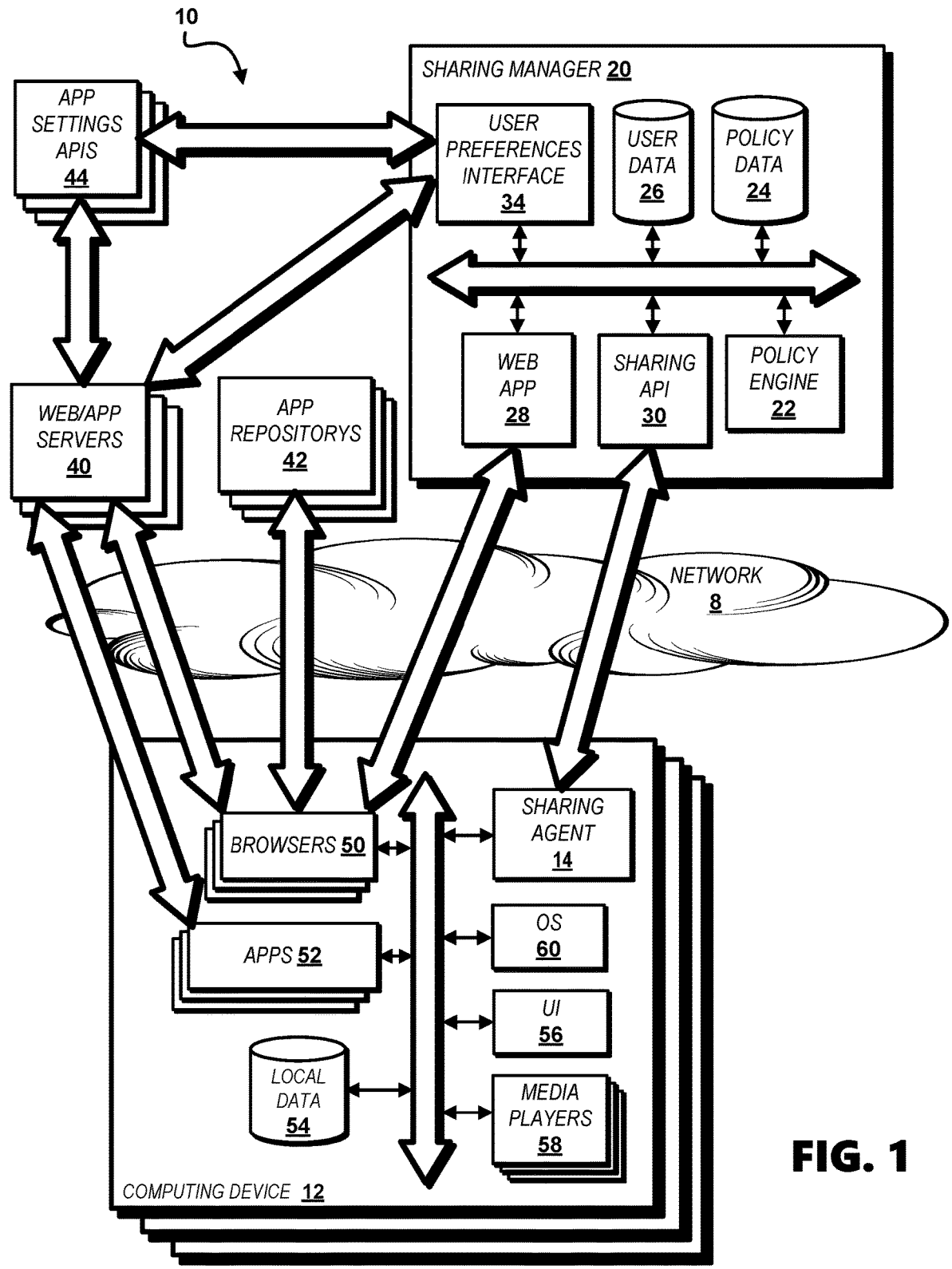
FIG. 1 shows a system for managing data according to illustrative embodiments.

Referring to FIG. 1, a system 10 for managing data is provided. The system 10 is provided in a communications network 8 including one or more wired or wireless networks or a combination thereof, for example including a local area network (LAN), a wide area network (WAN), the internet, mobile telephone networks, and wireless data networks such as Wi-Fi™ and 3G/4G/5G cellular networks. Operating system 60 (hereinafter "OS 60") is executed on computing devices 12. The system 10 enables monitoring, reporting, and enforcing compliance with sharing policies by platforms including websites, webpages of websites, and applications. Further, the system 10 enables the providing of a computing environment for a user to manage the user's preferences regarding use of their shared data by platforms. The system 10 provides an automated, intuitive, and personalized way for a user to specify policy settings for their shared data, for example shared image data files and video data files.

A network-connectable processor-enabled sharing manager 20 enables survey queries to be provided to a user of a computing device 12. The queries can be provided in a user interface 56 via instructions from a processor-enabled sharing agent 14 based on data transmitted from a sharing application program interface ("API") 30 of the sharing manager 20. Alternatively, queries can be provided via the user interface 56 based on data transmitted from a web application 28 enabled by the sharing manager 20 and accessible via a web browser 50 executed on the computing device 12. A user's responses to the survey queries include data sharing preferences which information is stored in a user datastore 26 or a local datastore 54 and which information is used by one or both of the sharing manager 20 and the sharing agent 14 in establishing sharing policies for data files shared with or to be shared with network-accessible computing systems which host websites, webpages of websites, and applications. A policy engine 22 can be used to generate sharing policies based on a user's data sharing preferences, which sharing policies can be stored in a policy datastore 24. Websites and applications can include for example social media or messaging applications for example Facebook™, LinkedIn™, and Google™ social media and messaging applications. Websites, webpages, and network-enabled applications are individually and jointly referred to herein as "platforms". Applications can include standalone applications, plugins, add-ons, or extensions to existing applications, for example web browser plugins. Applications or components thereof can be installed and executed locally on a computing device 12 or installed and executed on remote computing systems accessible to the computing device 12 via the communications network 8, for example the internet.

A website server or application server 40 (hereinafter "web/app server") can function to enable local applications 52 or components of a local application 52. Web/app servers 40 can further enable services including network-enabled applications, webpages, or other services accessible via a web browser 50. Local applications 52 can be downloaded for example via a web browser 50 from an application repository 42. The sharing agent 14 monitors user activity on the computing device 12 including a user's use of local and network-based applications, accessing of websites, and sharing of data files to platforms including local and network-based applications and websites.

To enable processes performed via the sharing agent 14 and the sharing manager 20, a user of a computing device 12 is beneficially queried by the sharing agent 14 via the user interface 56. The user can be provided a number of questions (e.g., 5-10 questions) regarding their sharing preferences. The questions relate to how a data file shared by the user to a website, webpage, application, or other network-enabled service (i.e. a "platform") should be retained by the website, webpage, application, or other network-enabled service. For example, a user can be queried whether they prefer that shared data files (e.g., image files or video files) are to be retained for a week, a month, or a year and then deleted on the platform to which the data files are shared. Further a user can be asked if they alternatively prefer that shared data files be degraded, for example decreasing resolution of an image file, over a particular time period (e.g., a number of days, weeks, months or years). The user's responses can be stored by the sharing agent 14 in a local datastore 54 or the user datastore 26.

Queries can be provided to a user during initialization of the sharing agent 14 on a computing device 12 of the user. Alternatively, queries can be provided to the user in response to a user's attempt to share a data file from the computing device 12 to a local application 52, a web/app server 40, or other application or system. In the case that the platform includes a hosted webpage, and the sharing agent 14 functions as an add-on or plugin to a web browser 50 which monitors activity of the web browser 50, the user's attempt to upload a data file to via the web browser to a webpage represented by a Universal Resource Locator ("URL") can trigger the queries.

The sharing agent 14, or alternatively the sharing manager 20 is configured to attach policy settings in the form of rules and specifications as metadata to data files, for example to files stored in the local datastore 54 or network-based datastores hosted by web/app servers 40. Policy settings in the form of rules and specifications can be attached per individual data file, per group of data files, or globally. For example, a six month degradation cycle can be applied globally for all image files, wherein the resolution of a shared image file is scheduled to be decreased periodically over the six month period, and the shared image file is scheduled to be deleted at the end of the six month period. In a further example, a three month degradation cycle can be applied globally for all video files, wherein the resolution of a shared video file is scheduled to be decreased periodically over the three month period, and the shared image file is scheduled to be deleted at the end of the three month period.

Internet platform providers operating via web/app servers 40 and local applications 52 are enabled to check and enforce temporal sharing policies recorded in the metadata of data files shared by users. Beneficially for example, social networking platforms can periodically update data quality of data files shared on the social networking platforms based on temporal sharing policies of the data files. The effect of the updates is that internet platforms are enabled to gradually forget data uploaded to the internet platforms.

Media player applications 58 (e.g., Adobe Acrobat Reader™, video viewing applications, and image viewing applications) are beneficially also enabled to check and enforce temporal sharing policies. Media player applications 58 performing checking and enforcing functions need not be located on computing devices 12 including the sharing agent 14, but can be located on any computing system with or without the presence of the sharing agent 14. Upon opening a data file shared online by a user, a media player application 58 is beneficially enabled to check for the existence of a temporal sharing policy attached to the data file. A media player application 58 is beneficially configured to degrade and save the data file as requested by the temporal sharing policy and present the degraded data file to a user of the media player application 58. For example, based on a temporal sharing policy, an image viewer can be configured to decrease the resolution of an image file to 50% of the image's original resolution at one month from the date of sharing, and to decrease the resolution of the image file to 25% of the image file's original resolution at two months from the date of sharing, and to prevent opening of the image file at three months from the date of sharing.

One or both of the sharing manager 20 and the sharing agent 14 can enforce sharing policies, the sharing policies requiring the gradual or abrupt digital forgetting of shared data files. One or both of the sharing manager 20 and the sharing agent 14 keeps track of the web/app servers 40 and corresponding universal resource locators ("URLs") to track data files uploaded to the web/app servers 40. The sharing agent 14 enables a user to specify the sharing policy for a particular data file at the time of the upload of the particular data file, for example specifying that images uploaded to a particular website should be degraded or expired after one year. The sharing agent 14 or the sharing manager 20 check for sharing policy compliance on the web/app servers 40. This check for sharing policy compliance can be automatic or responsive to an instruction from a user who shared the data, which instruction can be elicited by a query from the sharing agent 14. For example, a user can be queried by the sharing agent 14 via the user interface 56. An example query generated by the sharing agent 14 includes: "Your data has been on xyz.com for a year. Do you want to check for sharing policy compliance?"

One or both of the sharing manager 20 and the sharing agent 14 can also change sharing policies of data files after the data files are already uploaded to a particular platform. Further one or both of the sharing manager 20 and the sharing agent 14 can initiate a particular action to degrade or expire data files even if the data files do not include sharing policies or even if the data files include sharing policies which do not by themselves enable the particular action. The particular action can be automatic or responsive to an instruction from a user who shared the data, which instruction can be elicited by a query from the sharing agent 14. An example query generated by the sharing agent 14 includes: "Your data has been on abcxyz.com for a year. Do you want to degrade or expire your pictures on abcxyz.com?"

A sharing policy instituted by the sharing agent 14 or sharing manager 20 can also include the requirement that a platform does not forward a data file after a particular number of hops. A sharing policy can further include the requirement that a platform degrade a data file after a particular number of hops. Hops can include shares of a data file between users within a particular platform (e.g., shares between users within the Facebook™ platform), shares of a data file between users between different platforms (e.g., shares between users between the Facebook™ and Twitter™ platforms), or shares of a data file between users within a particular platform and shares between users between different platforms. After each hop of a data file, a platform provider is obligated to reduce the number of available hops reflected by the sharing policy attached to the data file. The sharing agent 14 and sharing manager 20 are configured to check and enforce compliance with the sharing policy across different platforms by tracking shares of the data file between different platforms, for example hosted by different web/app servers 40.

A sharing policy instituted by the sharing agent 14 or sharing manager 20 can further include the requirement that a platform permit sharing of a data file with particular users ("whitelisted" users) or that a platform not permit sharing a data file with particular users ("blacklisted" users). A whitelist may include for example friends and family of a user of the computing device 12, while a blacklist may include for example colleagues or other particular contacts of the user.

A sharing policy instituted by the sharing agent 14 or sharing manager 20 can further include instructions for dealing with machine learning applications or algorithms implemented by a particular platform. A sharing policy can include for example instructions that a data file should not be used in a machine learning dataset, that a data file should not be used for identifying a person (e.g., by image, by gestures, or by voice), and that a data file should not be used for location tracking or location identification (e.g., by landmark identification by image).

Figure 2:
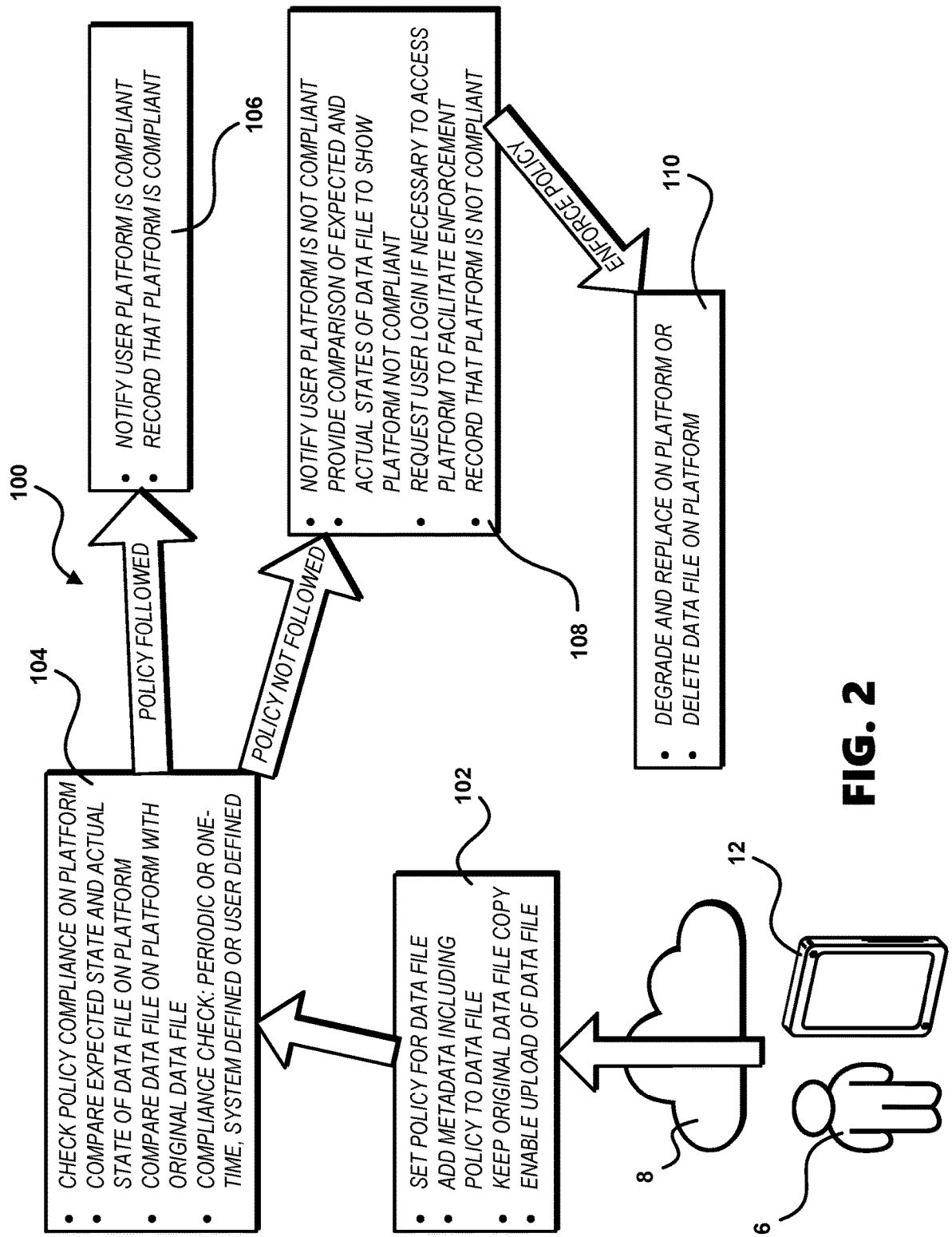
FIG. 2 is a diagram showing a process flow of a data managing process according to illustrative embodiments.

Referring to FIG. 2, a process flow 100 for managing data sharing is shown. The process flow 100 is described with reference to the components of the system 10 shown in FIG. 1, including for example the computing device 12, the processor-enabled sharing manager 20, web/app servers 40, the sharing agent 14, and the network 8. The process flow 100 includes process steps 102, 104, 106, 108, 110, each of which can be performed for instance via the sharing manager 20, the sharing agent 14, or the sharing manager 20 in combination with the sharing agent 14. Alternatively, the process flow 100 can be implemented via other suitable systems and is not restricted to being implemented by the components of the system 10. The process flow 100 can be triggered starting at the step 102 by a device user 6 of the computing device 12 attempting to upload a data file over the network 8 to a particular platform. Alternatively, the process flow 100 can be initiated before an attempt by a device user 6 to upload a data file or after a data file has been uploaded to a particular platform.

In the step 102, a policy including temporal sharing rules is set for the data file, metadata including the policy is added to the data file, and a copy of the data file is retained and stored. Beneficially, the metadata including the policy is added to the data file prior to upload of the data file to a platform (e.g., Facebook™, Twitter™), and beneficially uploading of the data file (with the added metadata) to the platform is enabled after the copy of the data file is retained and stored. In the step 104, after uploading the data file to the platform, the platform is checked for compliance with the policy added to the data file. Compliance is determined based on the policy included in the metadata of the data file. Compliance can take into consideration markers within the metadata of the data file, for example a marker indicating a number of shares on the platform since the data file was shared to the platform. A comparison is made of an expected state of the data file (including the state of its metadata) based on the policy to an actual state of the data file (including the state of its metadata) on the platform to determine compliance. Compliance can be further based on a comparison of the data file (including its metadata) present on the platform and the retained original data file (including its metadata), which original data file is for example stored by the sharing manager 20 or sharing agent 14 in the user datastore 26 or local datastore 54. The check for compliance can be periodic or one-time, which timing can be system defined or user defined.

If it is determined that the policy set for the data file is complied with by the platform, a user of the computing device 12 is notified and an indication that the platform is compliant with the policy is recorded (step 106). Recording the compliance enables tracking the compliance of the platform with respect to one or more policies of one or more data files shared to the platform from one or more users. If it is determined that the policy set for the data file is not complied with by the platform, in the step 108 a user of the computing device 12 is notified. Further, an indication that the policy platform is not compliant with the policy is recorded which enables tracking the compliance of the platform with respect to one or more policies of one or more data files shared to the platform from one or more users. Beneficially, a comparison of the expected state of the data file and the actual state of the data file is provided to the user to show the platform is not compliant. The expected state of the data file can include an expected level of degradation (e.g., resolution degradation) of a data file. Whether a level of degradation is appropriate based on the policy can be measured in comparison to a local copy (e.g., stored in the user datastore 26 or local datastore 54) or third-party copy (e.g., stored at a third-party network location) of the data file or based on a degradation metric. An expected state of a data file can include for instance an expected image resolution, file size, or detectability of a human face in reference to a differential privacy measure. A request is made for a user's login credentials if necessary to access an account of the user on the platform to facilitate enforcement of the policy.

In the step 110, the policy is enforced. The sharing manager 20 or sharing agent 14 can enforce the policy on the non-compliant platform. For example, a web/app server 40 enabling the platform can be accessed via a web browser 50 or a user preferences interface 34 to enforce the policy. Alternatively, an application settings API 44 enabling the setting of user preferences for the platform can be accessed by the user preferences interface 34 to enforce the policy. Enforcing the policy can include degrading a copy of the data file and replacing the data file stored by the platform with the degraded data file. For example, the sharing manager 20 or sharing agent 14 can create a copy of the retained and stored original data file from the user datastore 26 or the local datastore 54, and the sharing manager 20 or sharing agent 14 can degrade the copy of the original data file which is then used to replace the non-compliant data file stored by the platform. Alternatively, the sharing manager 20 or sharing agent 14 can copy the non-compliant data file from the platform and degrade the copy of the non-compliant data file, which degraded copy is then used to replace the non-compliant data file stored by the platform. Alternatively, in the step 110, the policy is enforced by expiring the data file on the platform. Expiring the data file is defined herein as rendering the data file inaccessible to others via the platform. Expiring the data file beneficially includes deleting the data file from the platform.

Figures 3A, 3B:
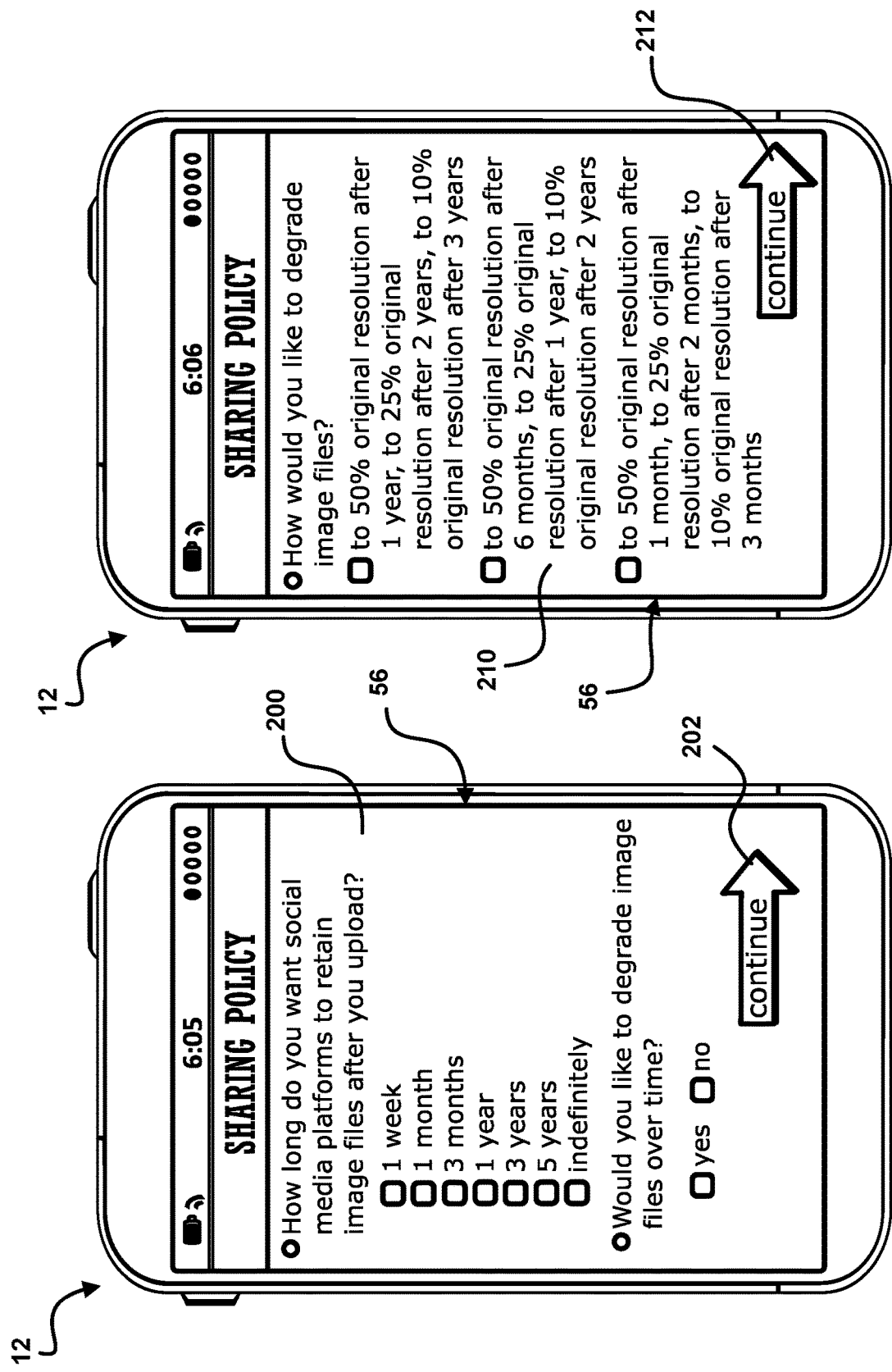
Figures 3C, 3D:
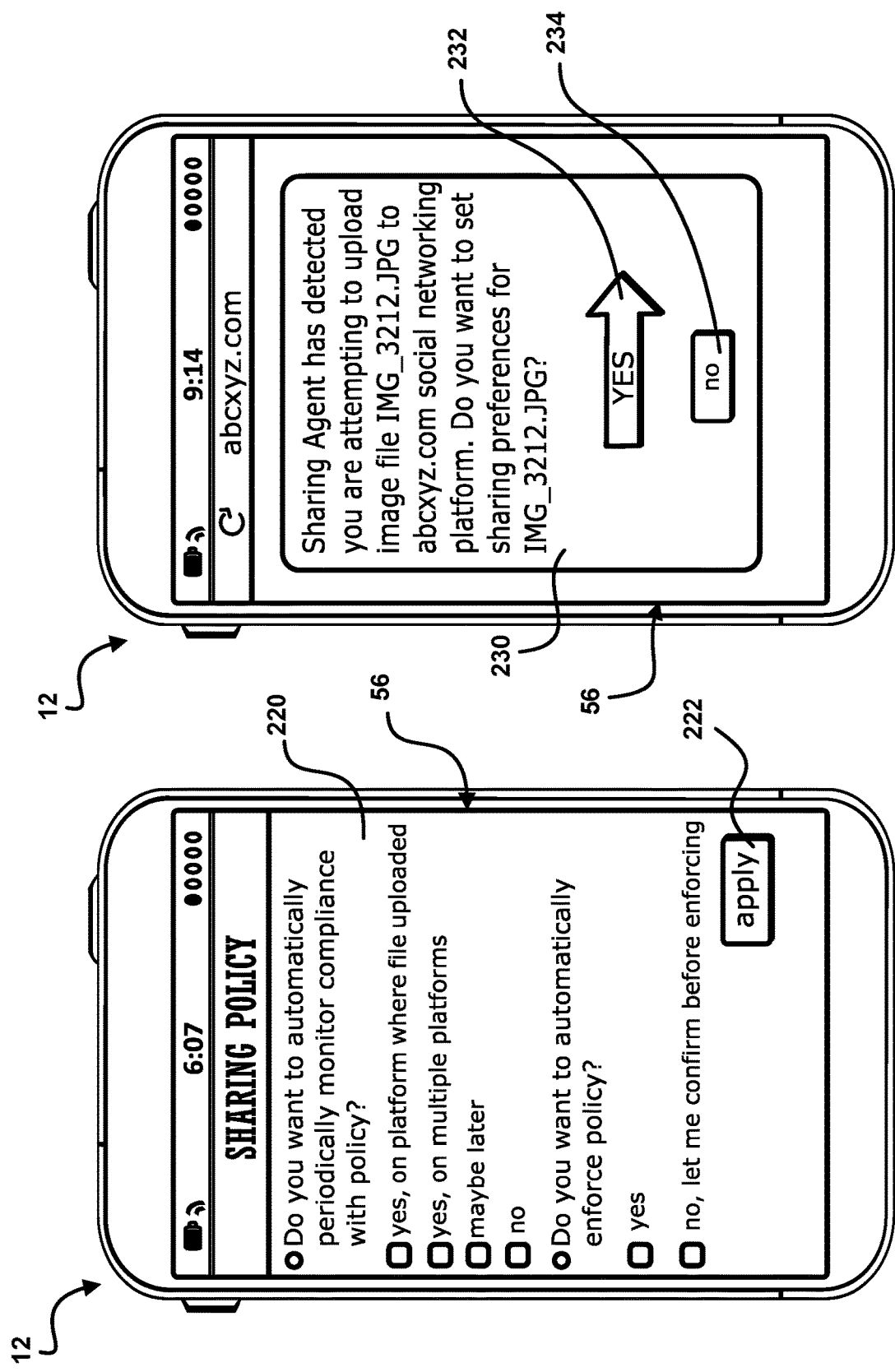

Referring to FIGS. 3A, 3B, and 3C, first, second, and third exemplary interactive displays 200, 210, 220 show queries generated by the sharing agent 14 via the user interface 56 of the computing device 12 during an initialization of the sharing agent 14 executed on the computing device 12. The user responses to the queries of the first, second, and third exemplary interactive displays 200, 210, 220 are used to generate sharing policies for attachment to a plurality of pre-existing data files and future data files of a user of the computing device. The first exemplary interactive display 200 queries "How long do you want social media platforms to retain image files after you upload?" Corresponding user-selectable responses are provided including "1 week", "1 month", "3 months", "1 year", "3 years", "5 years", and "indefinitely". The first exemplary interactive display 200 further queries "Would you like to degrade image files over time?" Corresponding user-selectable responses including "yes" and "no" are provided. An actuatable first "continue" button 202 is provided to accept selections via the first exemplary interactive display 200.

The second exemplary interactive display 210 queries "How would you like to degrade image files?" A corresponding first user-selectable response includes "to 50% original resolution after 1 year, to 25% original resolution after 2 years, to 10% original resolution after 3 years". A corresponding second user-selectable response includes "to 50% original resolution after 6 months, to 25% original resolution after 1 year, to 10% original resolution after 2 years". A corresponding third user-selectable response includes "to 50% original resolution after 1 month, to 25% original resolution after 2 months, to 10% original resolution after 3 months". An actuatable second "continue" button 212 is provided to accept selections via the second exemplary interactive display 210.

The third exemplary interactive display 220 queries "Do you want to automatically periodically monitor compliance with policy?" Corresponding user-selectable responses are provided including "yes, on platform where file uploaded", "yes, on multiple platforms", "maybe later", and "no". The third exemplary interactive display 220 further queries "Do you want to automatically enforce policy?" Corresponding user-selectable responses including "yes" and "no, let me confirm before enforcing" are provided. An actuatable "apply" button 222 is provided to accept selections via the third exemplary interactive display 220. By actuating the "apply" button 222, a user's responses to queries of the first, second, and third exemplary interactive displays 200, 210, 220 are stored in one or both of the local datastore 54 and the user datastore 26 for use by the sharing agent 14 or sharing manager 20 in generating sharing policies for a user's data files, for example via the policy engine 22.

Sharing policies can also be attached to data files on an individual basis. Referring to FIGS. 3D, 3E, 3F and 3G, fourth, fifth, sixth, and seventh exemplary interactive displays 230, 240, 250, 260 show alternative queries generated by the sharing agent 14 via the user interface 56 of the computing device 12. Responsive to a user's attempt to upload a particular image file, the fourth exemplary interactive display 230 is generated by the sharing agent 14 indicating "Sharing Agent has detected you are attempting to upload image file IMG_3212.JPG to abcxyz.com social networking platform." The fourth exemplary interactive display 230 further provides the query "Do you want to set sharing preferences for IMG_3212.JPG?" A corresponding actuatable "yes" button 232 and a corresponding actuatable "no" button 234 are provided to record a user response to the query.

Responsive to user actuation of the "yes" button 234, the fifth exemplary interactive display 240 is generated by the sharing agent 14. The fifth exemplary interactive display 240 queries "How long do you want IMG_3212.JPG retained on abcxyz.com?" Corresponding user-selectable responses are provided including "1 week", "1 month", "3 months", "1 year", "3 years", "5 years", and "indefinitely". The fifth exemplary interactive display 240 further queries "Would you like to degrade IMG_3212.JPG on abcxyz.com over time?" Corresponding user-selectable responses including "yes" and "no" are provided. An actuatable third "continue" button 242 is provided to accept selections via the fifth exemplary interactive display 240.

Responsive to a "yes" selection and actuation of the third "continue" button 242 in the fifth exemplary interactive display 240, the sixth exemplary interactive display 250 is generated by the sharing agent 14. The sixth exemplary interactive display 250 queries "How would you like to degrade IMG_3212.JPG on abcxyz.com?" A corresponding first user-selectable response includes "to 50% original resolution after 1 year, to 25% original resolution after 2 years, to 10% original resolution after 3 years". A corresponding second user-selectable response includes "to 50% original resolution after 6 months, to 25% original resolution after 1 year, to 10% original resolution after 2 years". A corresponding third user-selectable response includes "to 50% original resolution after 1 month, to 25% original resolution after 2 months, to 10% original resolution after 3 months". An actuatable fourth "continue" button 252 is provided to accept selections via the sixth exemplary interactive display 250.

Responsive to actuation of the fourth "continue" button 252 in the sixth exemplary interactive display 250, the seventh exemplary interactive display 260 is generated by the sharing agent 14. The seventh exemplary interactive display 260 queries "Do you want to automatically periodically monitor compliance with policy for IMG_3212.JPG?" Corresponding user-selectable responses are provided including "yes, on abcxyz.com", "yes, on multiple platforms", "maybe later", and "no". The seventh exemplary interactive display 260 further queries "Do you want to automatically enforce policy for IMG_3212.JPG?" Corresponding user-selectable responses including "yes" and "no, let me confirm before enforcing" are provided. An actuatable "apply" button 262 is provided to accept selections via the seventh exemplary interactive display 260. By actuation of the "apply" button 262, a user's responses to queries of the fourth, fifth, sixth, and seventh exemplary interactive displays 230, 240, 250, 260 are stored in one or both of the local datastore 54 and the user datastore 26 for use by the sharing agent 14 or the sharing manager 20 in generating a policy for the particular image ("IMG_3212.JPG") which is attempted to be uploaded via the computing device 12.

The sharing agent 14 enables notices or alerts regarding data files shared to platforms via a network. Referring to FIGS. 3H, 3I, and 3J, eighth, ninth, and tenth exemplary interactive displays 270, 280, 290 show notices generated by the sharing agent 14 via the user interface 56 of the computing device 12. The eighth exemplary interactive display 270 is provided for a user who has not authorized automatic periodic monitoring of platforms for compliance with a policy. The eighth exemplary interactive display 270 indicates "Your image IMG_3212.JPG has been on abcxyz.com for 1 year." Further, the eighth exemplary interactive display 270 queries "Do you want to check compliance with policy?" An image window 272 is displayed showing the image file regarding which compliance is to be checked. An actuatable "Check compliance" button 274 is provided to authorize the sharing agent 14 or sharing manager 20 to check compliance with the policy. An actuatable "Take no action" button 276 is provided to deny authorization to check compliance with the policy.

The ninth exemplary interactive display 280 is provided in response to a particular platform's failure to comply with a policy for a particular data file (image file "IMG_3212.JPG"). The ninth exemplary interactive display 280 indicates that "abcxyz.com has not complied with policy for image IMG_3212.JPG." Further, the ninth exemplary interactive display 280 queries "Do you want to degrade resolution of IMG_3212.JPG per policy or expire IMG_3212.JPG?" The ninth exemplary interactive display 280 displays an image window 282 showing the image file which is to be degraded or expired if authorized by the user. An actuatable "Degrade to 25% per policy" button 284 is provided to authorize the sharing agent 14 or sharing manager 20 to degrade the resolution of the image file IMG_3212.JPG on the abcxyz.com platform to 25% of the original image resolution. An actuatable "Expire" button 286 is provided to authorize the sharing agent 14 or sharing manager 20 to expire the image file IMG_3212.JPG on the abcxyz.com platform, for example to delete the image file IMG_3212.JPG from the abcxyz.com platform or otherwise render the image file IMG_3212.JPG inaccessible on the abcxyz.com platform. An actuatable "Take no action" button 288 is provided to deny authorization to the sharing agent 14 and the sharing manager 20 to enforce the policy for the image file IMG_3212.JPG.

The tenth exemplary interactive display 290 is provided for a user who has not authorized automatic enforcement of a policy for an image file IMG_3212.JPG. The tenth exemplary interactive display 290 indicates that "Your image IMG_3212.JPG has been on abcxyz.com for 1 year." Further, the tenth exemplary interactive display 290 queries "Do you want to degrade resolution of IMG_3212.JPG per policy or expire IMG_3212.JPG?" An image window 292 shows the image file which is to be degraded or expired if authorized by the user. An actuatable "Degrade to 25% per policy" button 294 is provided to authorize the sharing agent 14 or sharing manager 20 to degrade the resolution of the image file IMG_3212.JPG on the abcxyz.com platform to 25% of the original image resolution. An actuatable "Expire" button 296 is provided to authorize the sharing agent 14 or sharing manager 20 to expire the image file IMG_3212.JPG on the abcxyz.com platform, for example to delete the image file IMG_3212.JPG from the abcxyz.com platform or otherwise render the image file IMG_3212.JPG inaccessible on the abcxyz.com platform. An actuatable "Take no action" button 298 is provided to deny authorization to enforce the policy for the image file IMG_3212.JPG.

Figure 4:
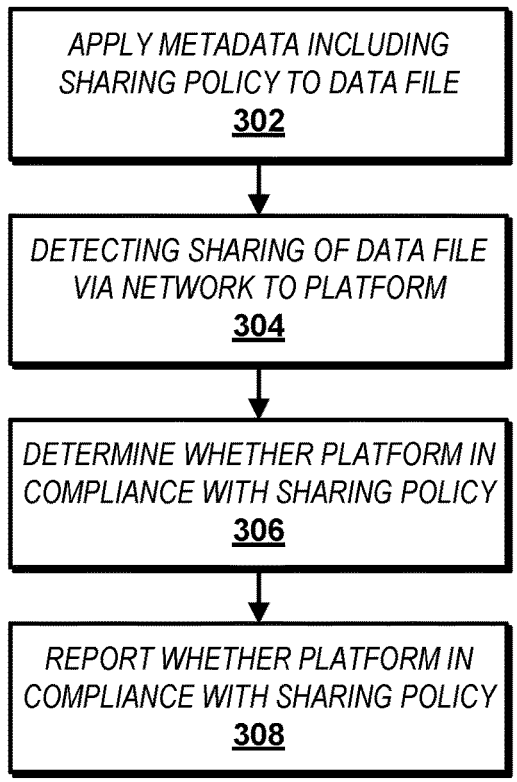
FIGS. 4 and 5 are diagrams showing methods of data managing according to illustrative embodiments.

Referring to FIG. 4, a data managing method 300 is shown. The method 300 is described with reference to the components of the system 10 shown in FIG. 1, including for example the computing device 12, the processor-enabled sharing manager 20, the web/app servers 40, the sharing agent 14, and the network 8. Alternatively, the method 300 can be performed via other suitable systems and is not restricted to being implemented by the components of the system 10.

In a step 302 metadata including a sharing policy is applied to a data file on a computing device. In a step 304, a sharing is detected of the data file from the computing device via a network to a platform hosted by a computing system. The computing system can operate in the capacity of a server or a client machine in server-client network environment, or as a peer machine in a peer-to-peer (or distributed) network environment. The computing system can also be considered to include a collection of machines that individually or jointly execute a set (or multiple sets) of instructions. The detected sharing of the data file can include a sharing of the data file to one or more of a website, a webpage of the website, or an application hosted by the computing system. It is determined whether the platform is in compliance with the sharing policy (step 306), and it is reported whether the platform is in compliance with the sharing policy (step 308). The determining whether the platform is in compliance with the sharing policy can include determining that the platform has complied with the sharing policy or has not complied with the sharing policy, and the reporting of whether the platform is in compliance with the sharing policy can respectively include reporting that the platform has complied with the sharing policy or has not complied with the sharing policy. The platform is beneficially checked periodically to determine whether the platform is in compliance with the sharing policy.

Beneficially, an attempt to share the data file by a user is detected via the computing device, and the metadata is applied responsive to detecting the attempt to share the data file. A user of the computing device can be queried for policy settings in the form of sharing preferences responsive to detecting the attempt to share the data file. The sharing policy can be generated based on the sharing preferences from the user.

The sharing policy can be provided with an instruction to degrade the data file one or more times over a time period or an instruction to degrade the data file based on a number of shares of the data file. The data file can include an image file, and the sharing policy can include an instruction to decrease a resolution of the image file once or more than once over the time period. The method can further include accessing the image file on the platform, determining the resolution of the image file on the platform, determining an elapsed time, and determining whether the platform is in compliance with the sharing policy based on the resolution of the image file on the platform, the elapsed time, and the instruction to decrease the resolution of the image file once or more than once over the time period. Alternatively, the method can further include accessing the image file on the platform, determining the resolution of the image file on the platform, determining the number of shares on the platform, and determining whether the platform is in compliance with the sharing policy based on the resolution of the image file on the platform, the number of shares on the platform, and the instruction to decrease the resolution of the image file based on the number of shares. The sharing policy can alternatively or further be provided with an instruction to remove the data file after a particular time period. The platform can be monitored to determine that the data file has been removed or has not been removed, and the determining that the data file has been removed or has not been removed can be reported to a user.

Alternatively, the sharing policy can be provided with an instruction directed at a particular media player application to degrade the data file after a particular time period. Further it can be determined that the data file has been accessed via the particular media player application or modified via the particular media player application, and it can be determined that the data file has not been degraded in compliance with the sharing policy by the particular media player application. Further, it can be reported that the data file has not been degraded in compliance with the sharing policy by the particular media player application, beneficially reported to a user who initiated the sharing of the data file from the computing device to the platform.

The sharing policy can be provided with an instruction to limit a number of shares of the data file to a particular threshold. The platform can be monitored to determine whether the platform is in compliance with the instruction to limit the number of shares. For example, the platform can be monitored to determine that the number of shares of the data file exceed the particular threshold. In such case the platform is not in compliance with the sharing policy. For example, the metadata of the data file on the platform can be tracked to determine that the number of shares of the data file exceed the particular threshold. It can be reported to a user that the number of shares of the data file exceed the particular threshold. The user can be notified for example that the platform is not in compliance with the sharing policy based on determining the shares of the data file exceed the particular threshold.

The sharing policy can be provided with an instruction to limit shares of the data file to particular recipients. The platform can be monitored to determine whether the platform is in compliance with the instruction to limit shares to the particular recipients. For example, the platform can be monitored to determine that the shares of the data file are not limited to the particular recipients. It can be reported that the shares of the data file are not limited to the particular recipients. A user can be notified for example that the platform is not in compliance with the sharing policy based on determining the shares of the data file were not limited to the particular recipients. Beneficially, the user is one who initiated the sharing of the data file from the computing device to the platform.

The sharing policy can be provided with an instruction to exclude particular recipients from shares of the data file. The platform can be monitored to determine whether the platform is in compliance with the instruction to exclude particular recipients from shares of the data file. For example, the platform can be monitored to determine that the particular recipients are not excluded from the shares of the data file. It can be reported that the particular recipients are not excluded from the shares of the data file. A user can be notified for example that the platform is not in compliance with the sharing policy based on determining that the particular recipients were not excluded from shares of the data file. Beneficially, the user is one who initiated the sharing of the data file from the computing device to the platform.

Moreover, the sharing policy can be provided with an instruction to not use the data file in a machine learning training dataset. Also, the sharing policy can be provided with an instruction to not use the data file to identify a person. Further, the sharing policy can be provided with an instruction to not use the data file to identify a location. In each case, the platform can be monitored to determine whether the platform is in compliance with the respective instruction, and a user can be notified of whether the platform is in compliance with the respective instruction.

Beneficially, the user is one who initiated the sharing of the data file from the computing device to the platform.

In an extension to the method 300, a query is transmitted to a user of the computing device regarding whether the user wants to determine whether the platform is in compliance with the sharing policy. A response to the query is received from the user, and it is determined whether the platform is in compliance with the sharing policy responsive to the response to the query from the user. The determining of whether the platform is in compliance with the sharing policy is reported, beneficially to a user who is one who initiated the sharing of the data file from the computing device to the platform.

In a further extension to the method 300, direction is received from a user of the computing device to degrade, expire, or degrade and expire the data file. An instruction is transmitted to the platform to alter the sharing policy to degrade, expire, or degrade and expire the data file responsive to the direction of the user. A query can be transmitted to the user of the computing device regarding whether the user wants to expire the data file, a response to the query can be received from the user, and an instruction can be transmitted to the platform to alter the sharing policy to expire the data file responsive to the response to the query. Alternatively, a query can be transmitted to a user of the computing device regarding whether the user wants to degrade the data file, a response to the query can be received from the user, and an instruction can be transmitted to the platform to alter the sharing policy to degrade the data file responsive to the response to the query.

In a further extension to the method 300, the data file is accessed on the platform, the data file accessed on the platform is compared with a copy of the data file as shared to the platform, and it is determined whether the platform is in compliance with the sharing policy based on the comparing of the data file accessed on the platform with the copy of the data file. For example, a copy of the data file shared to the platform is retained prior to sharing including the applied metadata, the data file is accessed on the platform, the data file accessed on the platform is compared with the copy of the data file, and it is determined whether the platform is in compliance with the sharing policy based on the comparing of the data file accessed on the platform with the copy of the data file. The comparing of the data file accessed on the platform with the copy of the data file can include comparing the applied metadata of the data file accessed on the platform to the applied metadata of the copy of the data file. Accessing the data file on the platform can be performed by an automated login to the account of a user of the computing device from which the data file was shared or via an application program interface of the platform using credentials of the user. Alternatively, a user can be requested to login to the platform to enable access to the platform.

In a further extension to the method 300, an expected degradation is determined of the data file on the platform, the data file is accessed on the platform, the data file accessed on the platform is compared to the expected degradation of data file on the platform, and it is determined whether the platform is in compliance with the sharing policy based on the comparing of the data file accessed on the platform to the expected degradation of the data file on the platform.

In a further extension to the method 300, it is determined that the platform has not complied with the sharing policy. The platform is accessed responsive to the determining that the platform has not complied with the sharing policy, and the sharing policy is enforced. Enforcing the sharing policy can include for example deleting the data file from the platform or degrading the data file on the platform. A user of the computing device can be requested to login to the platform to enable access to the platform, or the user of the computing device can be requested to provide credentials to enable login to enable access to the platform.

In a further extension to the method 300, a sharing of the data file from the platform via a network to another platform hosted by an other computing system is detected. It is determined whether the other platform is in compliance with the sharing policy, and it is reported whether the other platform is in compliance with the sharing policy.

Figure 5:
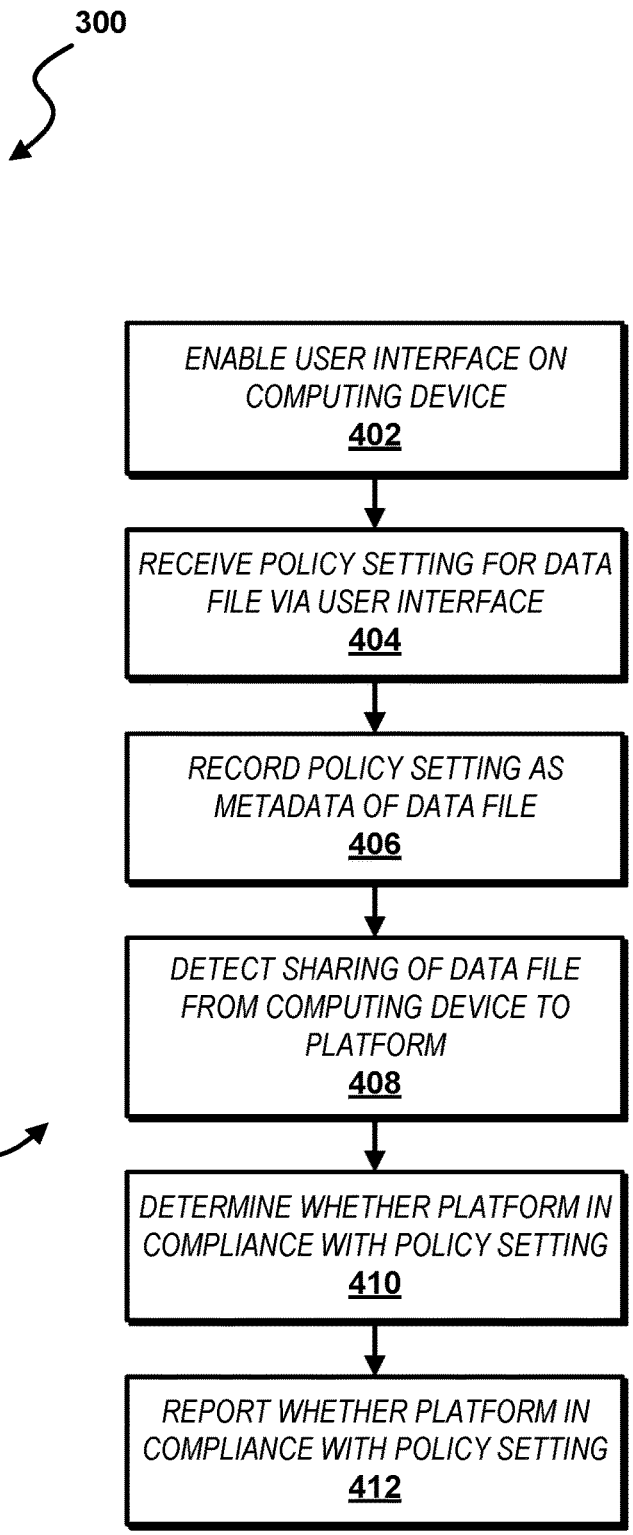

Referring to FIG. 5, a further data managing method 400 is shown. The method 400 is described with reference to the components of the system 10 shown in FIG. 1, including for example the computing device 12, the processor-enabled sharing manager 20, the web/app servers 40, the sharing agent 14, and the network 8. Alternatively, the method 400 can be performed via other suitable systems and is not restricted to being implemented by the components of the system 10.

In a step 402, a user interface is enabled on a computing device for receiving a policy setting for a data file. The policy setting for the data file is received via the user interface (step 404), and the policy setting is recorded as metadata of the data file (step 406). A sharing of the data file from the computing device via a network to a platform hosted by a computing system is detected (step 408). It is determined whether the platform is in compliance with the policy setting (step 410), and it is reported whether the platform is in compliance with the policy setting (step 412).

An attempt to share the data file by a user via the computing device to the platform can be detected. The user interface for receiving the policy setting for the data file can be enabled on the computing device responsive to the attempt to share the data file by the user via the computing device to the platform. The data file can be accessed on the computing device, for example from local or remote storage, and the policy setting can be recorded as the metadata of the data file on the computing device. Beneficially, the policy setting is recorded as the metadata of the data file on the computing device prior to the sharing of the data file to the platform. The policy setting can be pre-recorded prior to receiving the policy setting from the user, and an acceptance or non-acceptance of the pre-recorded policy setting can be recorded to the metadata responsive to a later-received policy setting from the user.

Alternatively, the policy setting can be recorded as the metadata of the data file on the computing device after the sharing of the data file to the platform, and the data file on the platform can be replaced or updated with the data file on the computing device including the policy setting recorded as the metadata of the data file. The data file can be accessed on the platform for example via login to the platform over the network, and the policy setting can be recorded as the metadata of the data file on the platform after the data file is shared to the platform via the login.

In an extension to the method 400, the data file is accessed on the platform, a number of shares of the data file on the platform is determined, and an expected degradation of the data file is determined based on the number of shares. The number of shares can be determined for example based on the metadata of the data file on the platform. An actual degradation of the data file on the platform is determined, the actual degradation of the data file is compared to the expected degradation of the data file, and it is determined whether the platform is in compliance with the policy setting based on the comparing of the actual degradation of the data file to the expected degradation of the data file.

In a further extension to the method 400, the data file is accessed on the platform, a number of shares of the data file on the platform is determined, it is determined that the platform has not complied with the policy setting based on the accessibility of the data file and the number of shares, and it is reported that the platform has not complied with the policy setting. Alternatively, the data file is accessed on the platform, a period of time that the data file was accessible on the platform is determined, it is determined that the platform has not complied with the policy setting based on the accessibility of the data file and the period of time that the data file was accessible on the platform, and it is reported that the platform has not complied with the policy setting. The reporting is beneficially made to a user from whom the policy setting was received and who initiated the sharing of the data file from the computing device to the platform.

Figure 6:
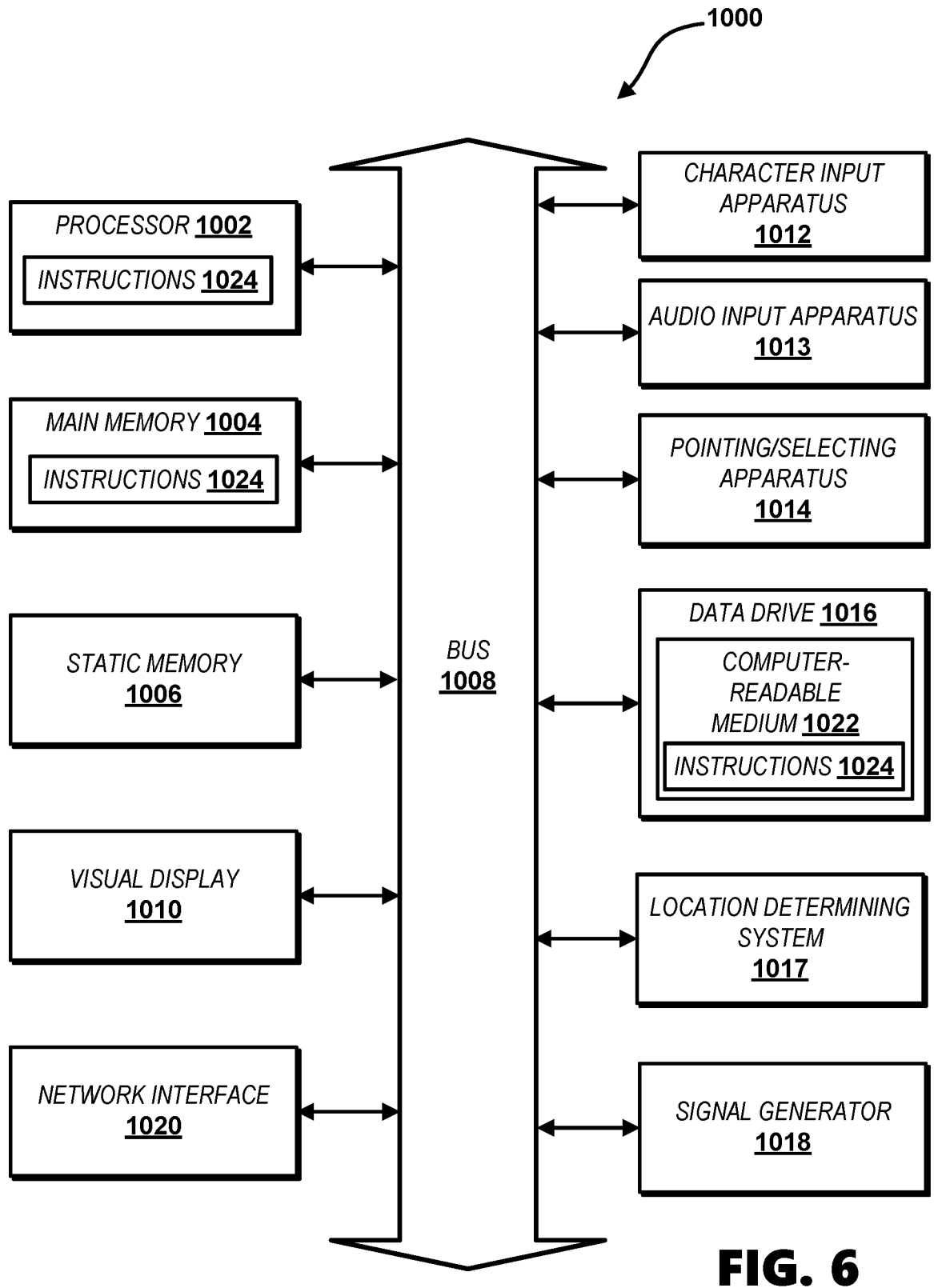
FIG. 6 is an illustrative computer system for performing described methods according to the illustrative embodiments.

FIG. 6 illustrates in abstract the function of an exemplary computer system 1000 on which the systems, methods and processes described herein can execute. For example, the computing device 12, sharing manager 20, and the web/app servers 40 can each be embodied by a particular computer system 1000. The computer system 1000 may be provided in the form of a personal computer, laptop, handheld mobile communication device, mainframe, distributed computing system, or other suitable configuration. Illustrative subject matter is in some instances described herein as computer-executable instructions, for example in the form of program modules, which program modules can include programs, routines, objects, data structures, components, or architecture configured to perform particular tasks or implement particular abstract data types. The computer-executable instructions are represented for example by instructions 1024 executable by the computer system 1000.

The computer system 1000 can operate as a standalone device or can be connected (e.g., networked) to other machines. In a networked deployment, the computer system 1000 may operate in the capacity of a server or a client machine in server-client network environment, or as a peer machine in a peer-to-peer (or distributed) network environment. The computer system 1000 can also be considered to include a collection of machines that individually or jointly execute a set (or multiple sets) of instructions to perform one or more of the methodologies described herein.

It would be understood by those skilled in the art that other computer systems including but not limited to networkable personal computers, minicomputers, mainframe computers, handheld mobile communication devices, multiprocessor systems, microprocessor-based or programmable electronics, and smart phones could be used to enable the systems, methods and processes described herein. Such computer systems can moreover be configured as distributed computer environments where program modules are enabled and tasks are performed by processing devices linked through a communications network, and in which program modules can be located in both local and remote memory storage devices.

The exemplary computer system 1000 includes a processor 1002, for example a central processing unit (CPU) or a graphics processing unit (GPU), a main memory 1004, and a static memory 1006 in communication via a bus 1008. A visual display 1010 for example a liquid crystal display (LCD), light emitting diode (LED) display or a cathode ray tube (CRT) is provided for displaying data to a user of the computer system 1000. The visual display 1010 can be enabled to receive data input from a user for example via a resistive or capacitive touch screen. A character input apparatus 1012 can be provided for example in the form of a physical keyboard, or alternatively, a program module which enables a user-interactive simulated keyboard on the visual display 1010 and actuatable for example using a resistive or capacitive touchscreen. An audio input apparatus 1013, for example a microphone, enables audible language input which can be converted to textual input by the processor 1002 via the instructions 1024. A pointing/selecting apparatus 1014 can be provided, for example in the form of a computer mouse or enabled via a resistive or capacitive touch screen in the visual display 1010. A data drive 1016, a signal generator 1018 such as an audio speaker, and a network interface 1020 can also be provided. A location determining system 1017 is also provided which can include for example a GPS receiver and supporting hardware.

The instructions 1024 and data structures embodying or used by the herein-described systems, methods, and processes, for example software instructions, are stored on a computer-readable medium 1022 and are accessible via the data drive 1016. Further, the instructions 1024 can completely or partially reside for a particular time period in the main memory 1004 or within the processor 1002 when the instructions 1024 are executed. The main memory 1004 and the processor 1002 are also as such considered computer-readable media.

While the computer-readable medium 1022 is shown as a single medium, the computer-readable medium 1022 can be considered to include a single medium or multiple media, for example in a centralized or distributed database, or associated caches and servers, that store the instructions 1024. The computer-readable medium 1022 can be considered to include any tangible medium that can store, encode, or carry instructions for execution by a machine and that cause the machine to perform any one or more of the methodologies described herein, or that can store, encode, or carry data structures used by or associated with such instructions. Further, the term "computer-readable storage medium" can be considered to include, but is not limited to, solid-state memories and optical and magnetic media that can store information in a non-transitory manner. Computer-readable media can for example include non-volatile memory such as semiconductor memory devices (e.g., magnetic disks such as internal hard disks and removable disks, magneto-optical disks, CD-ROM and DVD-ROM disks, Erasable Programmable Read-Only Memory (EPROM), Electrically Erasable Programmable Read-Only Memory (EEPROM), and flash memory devices).

The instructions 1024 can be transmitted or received over a communications network, for example the communications network 8, using a signal transmission medium via the network interface 1020 operating under one or more known transfer protocols, for example FTP, HTTP, or HTTPs. Examples of communication networks include a local area network (LAN), a wide area network (WAN), the internet, mobile telephone networks, Plain Old Telephone (POTS) networks, and wireless data networks, for example Wi-Fi™ and 3G/4G/5G cellular networks. The term "computer-readable signal medium" can be considered to include any transitory intangible medium that is capable of storing, encoding, or carrying instructions for execution by a machine, and includes digital or analog communications signals or other intangible medium to facilitate communication of such instructions.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

While embodiments have been described in detail above, these embodiments are non-limiting and should be considered as merely exemplary. Modifications and extensions may be developed, and all such modifications are deemed to be within the scope defined by the appended claims.

What is claimed is:

1. A data managing method comprising:
applying metadata including a sharing policy to a data file on a computing device;
detecting a sharing of the data file from the computing device via a network to a platform hosted by a computing system;
retaining a copy of the data file shared to the platform including the applied metadata;
accessing the data file on the platform;
comparing the data file accessed on the platform to the copy of the data file, the comparing of the data file accessed on the platform to the copy of the data file comprising comparing the applied metadata of the data file accessed on the platform to the applied metadata of the copy of the data file;
determining whether the platform is in compliance with the sharing policy based on the comparing of the data file accessed on the platform to the copy of the data file; and
reporting whether the platform is in compliance with the sharing policy.

2. The method of claim 1, further comprising:
detecting an attempt to share the data file by a user via the computing device; and
applying the metadata responsive to detecting the attempt to share the data file.

3. The method of claim 1, further comprising:
detecting an attempt to share the data file by a user via the computing device;
querying the user via the computing device for sharing preferences responsive to detecting the attempt to share the data file;
receiving the sharing preferences from the user; and
generating the sharing policy based on the sharing preferences from the user.

4. The method of claim 1, further comprising providing the sharing policy with an instruction to degrade the data file at least once over a time period.

5. The method of claim 1, further comprising providing the sharing policy with an instruction to degrade the data file based on a number of shares of the data file.

6. The method of claim 1, wherein:
the determining whether the platform is in compliance with the sharing policy comprises determining that the platform has not complied with the sharing policy; and
the reporting whether the platform is in compliance with the sharing policy comprises reporting that the platform has not complied with the sharing policy.

7. The method of claim 1, further comprising:
transmitting a query to a user of the computing device regarding whether the user wants to determine whether the platform is in compliance with the sharing policy;
receiving a response to the query from the user;
determining whether the platform is in compliance with the sharing policy responsive to the response to the query from the user; and
reporting the determining of whether the platform is in compliance with the sharing policy.

8. The method of claim 1, further comprising:
transmitting a query to a user of the computing device regarding whether the user wants to degrade the data file;
receiving a response to the query from the user; and
transmitting an instruction to the platform to alter the sharing policy to degrade the data file responsive to the response to the query.

9. The method of claim 1, further comprising:
transmitting a query to a user of the computing device regarding whether the user wants to expire the data file;
receiving a response to the query from the user; and
transmitting an instruction to the platform to alter the sharing policy to expire the data file responsive to the response to the query.

10. The method of claim 1, further comprising:
receiving direction from a user of the computing device to at least one of degrade or expire the data file; and
transmitting an instruction to the platform to alter the sharing policy to at least one of degrade or expire the data file responsive to the direction from the user.

11. The method of claim 1, further comprising:
determining the platform has not complied with the sharing policy;
accessing the platform responsive to the determining that the platform has not complied with the sharing policy; and
enforcing the sharing policy.

12. The method of claim 11, wherein the enforcing of the sharing policy comprises deleting the data file from the platform.

13. The method of claim 11, wherein the enforcing of the sharing policy comprises degrading the data file on the platform.

14. The method of claim 11, further comprising requesting at least one of that a user of the computing device login to the platform to enable access to the platform or that the user of the computing device provide credentials to enable login to enable access to the platform.

15. The method of claim 1, further comprising checking the platform periodically to determine whether the platform is in compliance with the sharing policy.

16. The method of claim 1, further comprising providing the sharing policy with an instruction directed at a particular media player application to degrade the data file after a particular time period.

17. The method of claim 16, further comprising:
determining that the data file has been at least one of accessed via the particular media player application or modified via the particular media player application;
determining that the data file has not been degraded in compliance with the sharing policy by the particular media player application; and
reporting that the data file has not been degraded in compliance with the sharing policy by the particular media player application.

18. The method of claim 1, wherein the sharing of the data file from the computing device via the network to the platform comprises sharing the data file to at least one of a website or an internet application hosted by at least one network-accessible computing system.

19. The method of claim 1, further comprising:
detecting a sharing of the data file from the platform via the network to an other platform hosted by an other computing system;

determining whether the other platform is in compliance with the sharing policy; and reporting whether the other platform is in compliance with the sharing policy.

20. A data managing method comprising:

applying metadata including a sharing policy to a data file comprising an image file on a computing device, the sharing policy comprising an instruction to decrease a resolution of the image file at least once over a time period;

detecting a sharing of the data file from the computing device via a network to a platform hosted by a computing system;

accessing the image file on the platform;

determining the resolution of the image file on the platform;

determining an elapsed time;

determining whether the platform is in compliance with the sharing policy based on the resolution of the image file on the platform, the elapsed time, and the instruction to decrease the resolution of the image file at least once over the time period; and reporting whether the platform is in compliance with the sharing policy.

21. The method of claim 20, the method further comprising:

providing the sharing policy with an instruction to remove the data file after a particular time period;

monitoring the platform to determine that the data file has not been removed; and reporting to a user the determining that the data file has not been removed.

22. The method of claim 20, the method further comprising:

providing the sharing policy with an instruction to remove the data file after a particular time period;

monitoring the platform to determine that the data file has been removed; and reporting to a user the determining that the data file has been removed.

23. The method of claim 20, further comprising:

determining an expected resolution degradation of the image file on the platform;

comparing the image file accessed on the platform to the expected resolution degradation of the image file on the platform; and determining whether the platform is in compliance with the sharing policy based on the comparing of the image file accessed on the platform to the expected resolution degradation of the image file on the platform.

24. A data managing method comprising:

applying metadata including a sharing policy to a data file comprising an image file on a computing device, the sharing policy comprising an instruction to decrease a resolution of the image file based on a number of shares of the data file;

detecting a sharing of the data file from the computing device via a network to a platform hosted by a computing system;

accessing the image file on the platform;

determining the resolution of the image file on the platform;

determining the number of shares on the platform;

determining whether the platform is in compliance with the sharing policy based on the resolution of the image file on the platform, the number of shares on the platform, and the instruction to decrease the resolution of the image file based on the number of shares; and reporting whether the platform is in compliance with the sharing policy.

25. The method of claim 24, further comprising:

comparing the image file accessed on the platform with a copy of the image file as shared to the platform; and determining whether the platform is in compliance with the sharing policy based on the comparing of the image file accessed on the platform with the copy of the image file.

26. A data managing method comprising:

applying metadata including a sharing policy to a data file on a computing device, the sharing policy comprising an instruction to limit a number of shares of the data file to a particular threshold;

detecting a sharing of the data file from the computing device via a network to a platform hosted by a computing system;

monitoring the platform to track the metadata of the data file on the platform to determine that the number of shares of the data file exceed the particular threshold; and reporting to a user that the number of shares of the data file exceed the particular threshold.

27. The method of claim 26, the method further comprising:

providing the sharing policy with an instruction to limit shares of the data file to particular recipients;

monitoring the platform to determine that the shares of the data file are not limited to the particular recipients; and reporting that the shares of the data file are not limited to the particular recipients.

28. The method of claim 26, the method further comprising:

providing the sharing policy with an instruction to exclude particular recipients from shares of the data file;

monitoring the platform to determine that the particular recipients are not excluded from the shares of the data file; and reporting that the particular recipients are not excluded from the shares of the data file.

29. The method of claim 26, the method further comprising providing the sharing policy with an instruction to not use the data file in a machine learning training dataset.

30. The method of claim 26, the method further comprising providing the sharing policy with an instruction to not use the data file to identify a person.

31. The method of claim 26, the method further comprising providing the sharing policy with an instruction to not use the data file to identify a location.

32. A method comprising:

enabling on a computing device a user interface for receiving a policy setting for a data file;

receiving the policy setting for the data file via the user interface;

recording the policy setting as metadata of the data file;

detecting a sharing of the data file from the computing device via a network to a platform hosted by a computing system;

accessing the data file on the platform;

determining a number of shares of the data file on the platform;

determining an expected degradation of the data file based on the number of shares;

determining an actual degradation of the data file on the platform;

comparing the actual degradation of the data file to the expected degradation of the data file;

determining whether the platform is in compliance with the policy setting based on the comparing of the actual degradation of the data file to the expected degradation of the data file; and reporting whether the platform is in compliance with the policy setting.

33. The method of claim 32, further comprising determining the number of shares based on the metadata of the data file on the platform.

34. The method of claim 32, further comprising:

detecting an attempt to share the data file by a user via the computing device to the platform; and enabling on the computing device the user interface for receiving the policy setting for the data file responsive to the attempt to share the data file by the user via the computing device to the platform.

35. The method of claim 32, further comprising recording the policy setting as the metadata of the data file on the platform.

36. The method of claim 32, further comprising:

accessing the data file on the computing device; and recording the policy setting as the metadata of the data file on the computing device prior to the detecting the sharing.

37. A system for managing data comprising:

a computing device comprising at least a first hardware processor and at least a first non-transitory computer-readable storage medium coupled to the at least the first hardware processor and storing first programming instructions for execution by the at least the first hardware processor, wherein the first programming instructions, when executed, cause the computing device to perform first operations comprising:

applying metadata including a sharing policy to a data file on the computing device; and detecting a sharing of the data file from the computing device via a network to a platform hosted by a computing system; and a server comprising at least a second hardware processor and at least a second non-transitory computer-readable storage medium coupled to the at least the second hardware processor and storing second programming instructions for execution by the at least the second hardware processor, wherein the second programming instructions, when executed, cause the server to perform second operations comprising:

determining the platform has not complied with the sharing policy;

accessing the platform via the network;

degrading the data file on the platform responsive to determining the platform has not complied with the sharing policy; and reporting the platform has not complied with the sharing policy.

38. The system of claim 37, wherein the second programming instructions, when executed, cause the server to perform the second operations further comprising deleting the data file on the platform responsive to determining the platform has not complied with the sharing policy.

* * * * *